United States Patent
Kubitz et al.

(10) Patent No.: US 7,563,972 B2
(45) Date of Patent: Jul. 21, 2009

(54) MUSICAL INSTRUMENT SIGNALING SYSTEM

(75) Inventors: Walter Kubitz, Fairfax, VA (US); Rocky A. Cota, Granada Hills, CA (US); Kenneth J. Franco, Chandler, AZ (US)

(73) Assignee: Walter E. Kubitz, Fairfax, VA (US)

( * ) Notice: Subject to any disclaimer, the term of this patent is extended or adjusted under 35 U.S.C. 154(b) by 557 days.

(21) Appl. No.: 11/347,500

(22) Filed: Feb. 3, 2006

(65) Prior Publication Data

US 2006/0123978 A1 Jun. 15, 2006

Related U.S. Application Data

(63) Continuation-in-part of application No. PCT/US2004/033594, filed on Oct. 8, 2004.

(60) Provisional application No. 60/510,082, filed on Oct. 10, 2003, provisional application No. 60/537,017, filed on Jan. 20, 2004.

(51) Int. Cl.
*G10H 1/00* (2006.01)
*G10H 7/00* (2006.01)

(52) U.S. Cl. .................. 84/600; 84/464 A; 84/464 R; 84/477 R; 84/485 R; 84/645

(58) Field of Classification Search .................. 84/600, 84/477 R, 464 R, 464 A, 485 R, 645
See application file for complete search history.

(56) References Cited

U.S. PATENT DOCUMENTS

| | | | | |
|---|---|---|---|---|
| 3,027,794 A | * | 4/1962 | Chute | 84/406 |
| 4,167,783 A | * | 9/1979 | Mitchell | 362/236 |
| 4,213,372 A | * | 7/1980 | Sasaki et al. | 84/470 R |
| 4,417,824 A | * | 11/1983 | Paterson et al. | 400/477 |
| 4,434,454 A | * | 2/1984 | Day | 362/238 |
| 4,819,539 A | * | 4/1989 | Searing | 84/476 |
| 5,247,864 A | * | 9/1993 | Konishi | 84/477 R |
| 5,461,188 A | * | 10/1995 | Drago et al. | 84/600 |
| 5,763,805 A | * | 6/1998 | Yamabata et al. | 84/645 |
| 5,907,115 A | * | 5/1999 | Matsunaga et al. | 84/477 R |

* cited by examiner

*Primary Examiner*—Jeffrey Donels
*Assistant Examiner*—Christina Russell
(74) *Attorney, Agent, or Firm*—Albert O. Cota

(57) ABSTRACT

A musical instrument signaling system (10) that is designed to alert a player of a hand-held musical instrument when to commence and stop playing the instrument. Typically, the hand-held musical instrument consists of a handbell as used by members of a bell choir. The system (10) is disclosed in five embodiments, wherein each embodiment has a transmitting circuit that includes a musical instrument such as a keyboard, and a receiving circuit. In the first, third and fifth embodiments a set of electrical signals containing the notes are transmitted through space. In the second and fourth embodiments the signals containing the notes are transmitted from the transmitter circuit to the receiving circuit by a hardwired cable. In all five embodiments only the selected notes of a musical performance are sent to the bell ringers.

22 Claims, 13 Drawing Sheets

1

MUSICAL INSTRUMENT SIGNALING SYSTEM

CROSS-REFERENCE TO RELATED APPLICATIONS

This application is a Continuation-In-Part (C.I.P.) of PCT application PCT/US2004/033594 filed on Oct. 8, 2004, in which the US is designated.

This application claims priority of Provisional Patent Applications: 60/510,082 filed on 10 Oct. 2003 and 60/537,017 filed on 20 Jan. 2004, and PCT application PCT/US2004/033594 filed on 08 Oct. 2004.

TECHNICAL FIELD

The invention generally pertains to the performance of music by a group using musical instruments, and more particularly to a means for signaling individual members of the musical group when they are to play their musical instruments.

BACKGROUND ART

Handbell choirs have been around for many years and have performed in churches, schools and other settings. Handbell music typically sounds quite beautiful, however the music can be significantly affected by the quality of the handbells. More importantly, much depends on the coordination of the sounds produced by the individual bell-ringers.

In a typical handbell choir, each individual in the choir holds in their hand one or two bells. Each bell in the choir rings a single note unique from the notes of all the other bells in the choir. A musical piece is performed by choir members ringing a coordinated succession of musical notes that correspond with the notes of the song being performed.

Proper coordination of the ringing of the various bells by the handbell choir members is a challenge for any handbell choir. This coordination could be described as "signaling" to the choir members when each bell is to be rung.

Signaling the times when handbell choir members are to ring their bells can be done by preprogramming. Preprogramming is the process by which individual choir members memorize the sequence of bell-ringing for a particular musical piece. The disadvantage to preprogramming is that it requires a significant amount of memorization and practice for each handbell choir member to ready themselves for even a simple musical performance.

As an alternative to preprogramming, signaling the times when each handbell choir member is to ring their specific bell can be done by having each choir member read a musical score, and from the musical score take cues as to when particular notes are to be sounded. The advantage of such music-reading is that it lessens the amount of practice necessary for the handbell choir members to ready themselves for a musical performance. The disadvantage to such music-reading is that it requires each choir member to be able to read music, a skill which most members of the general public, as well as many musicians do not have. Such disadvantages are especially pronounced when the handbell choir members are children. Children tend to have shorter attention-spans than adults and thus are less likely to memorize bell-ringing sequences or to spend the time required learning to read music.

One solution to the short-attention-span problem has been color-coded or number-coded handbells. Each handbell is given its own distinctive color or number that corresponds with a note to be sounded. The handbell choir members then view a musical score that shows a sequence of colors or numbers to match the sequence of the notes that such colors or numbers represent. An example of the color or number coding is a handbell choir in which each member looks at a single musical score in large print that is held in front of the entire choir. The musical notes on such a musical score are colored or numbered according to the coloring or numbering of the bells corresponding with the notes. The leader of the choir then uses a pointer to indicate each note in succession in the musical score. As the leader indicates each note, the handbell choir member holding the bell whose color or number matches the color or number of the note being indicated sounds their bell.

This color or number coding is especially suitable for handbell choirs made up of children. Yet, as simple as this color or number coding sounds, in practice it has proven to be inadequate because many children fail to concentrate on the musical score. The result is that certain sequences of notes are sounded, between which are brief but bothersome pauses while the various choir-members attempt to locate the inattentive person whose lack of concentration has caused the choir's performance to flounder. Additionally, as a result of the necessity of utilizing a musical score in large part that is in front of the choir. What is needed is a more individualized system of alert signals, such as a means for signaling individual handbell choir members when each one is to ring their specific bell. The signaling means should also not interfere or detract from the visual appearance of a choir on a stage or other performance setting A search of the prior art did not disclose any industry literature or patents that read directly on the claims of the instant invention. However, the following U.S. patents are considered related:

| PATENT NO. | INVENTOR | ISSUED |
| --- | --- | --- |
| 5,907,115 | Matsunaga, et al | May 25, 1999 |
| 5,763,805 | Yamabata, et al | Jun. 9, 1998 |
| 5,461,188 | Drago, et al | Oct. 24, 1995 |
| 5,247,864 | Konishi | Sep. 28, 1993 |
| 4,434,454 | Day | Feb. 28, 1984 |
| 4,417,824 | Peterson, et al | Nov. 29, 1983 |
| 4,167,783 | Mitchell | Sep. 11, 1979 |

The U.S. Pat. No. 5,907,115 patent discloses a keyboard musical instrument having a keyboard range display device with which the positions of the player's hands or fingers on a keyboard and the keys to be depressed are visually identified. The instrument allows a player to immediately perceive the range that is defined, so that he can easily move his fingers to correspond with the range.

The U.S. Pat. No. 5,763,805 patent discloses a performance information transmission system that includes a performance information transmitter device and a performance information receiver device. Both devices are capable of correcting transmission errors that occur from the transmitter device to the receiver device. The transmitter device is equipped with a state information generating device which generates state information for indicating the control state of a musical note after a change has occurred. The receiving device is equipped with a receiver that receives sequentially an event information which causes a change in a predetermined musical tone and the state information indicating the control state of a musical note of the predetermined musical note.

The U.S. Pat. No. 5,461,188 patent discloses a synthesized music, sound and light system that is incorporated into articles of clothing. The system, when activated, allows a multiplicity of lights to illuminate in synchrony with the rhythmic beat of either an internal music or sound program that is heard through an audio transducer. When the system is incorporated into a pair of shoes, a person can perform a dance routine or other form of expression in compliment with the selected music and light program.

The U.S. Pat. No. 5,247,864 patent discloses a display apparatus for an electronic musical instrument that includes a display section, a register section for reading out the display time information, and a counter section for performing a countdown operation in a predetermined time interval with the display time.

The U.S. Pat. No. 4,434,454 patent discloses an active lighting system that includes at least one light stand that supports a plurality of individually adjustable colored lights and a keyboard unit. The keyboard has a plurality of switches and light intensity controlling elements that enable the intensity of the various lights to be selectively varied to create a rhythm-to-color display.

The 4,417,824 patent discloses a keyboard assembly having a matrix of keybuttons, a plural light source assembly and a plural sensor assembly. Each light source is exclusively and sequentially energized, thus causing its light to be transmitted through a light transmission member.

The 4,167,783 patent discloses a portable lighting system that includes a stand having an adjustable length which positions lights carried on a frame at a predetermined vertical position. The frame is secured to the stand and can readily be set up and dismantled for transport in a compact space. Lights carried by the frame are connected to a foot operated control box which includes switches actuated to energize preselected lights. The preselected energized lights can be intensity modulated with a foot operated dimmer while leaving the operator's hands free to play a musical instrument.

Related website: www.thevisualizer.com

This website covers an electronic keyboard that is used in a classroom to provide an overhead display of the keyboard keys being depressed by an instructor.

For background purposes and as indicative of the art to which the invention relates, reference may be made to the following remaining patents found in the search:

| PATENT NO. | INVENTOR | ISSUED |
|---|---|---|
| 4,819,539 | Searing | Apr. 11, 1989 |
| 4,213,372 | Sasaki, et al | Jul. 22, 1980 |
| 3,027,794 | Chute | Apr. 1, 1962 |

DISCLOSURE OF THE INVENTION

The musical instrument signaling system (MISS) is designed to produce a set of signals or cues to individual members of a group of musical instrumentalists as to when each member is to play their particular instrument. Typically, the musical instrument is comprised of a handbell as used in bell choirs. In its basic form, the MISS consists of:

a) Means for producing a set of musical notes, wherein the musical selecting means is selected from the group consisting of an electronic keyboard, a piano, an organ and a xylophone, b) Means for converting the set of musical notes into a corresponding set of electrical signals, c) Means for passing the electrical signals to at least one remotely located musical instrument that is played by a person, d) Means for receiving the electrical signals at the remotely located musical instrument, and e) At least one signaling device that can consist of either an audio device, a vibrator, or an illumination display that can consist of a Light Emitting Diode (LED), an electro-luminescent panel, an incandescent bulb or a fluorescent bulb, wherein the signaling device is activated by a specific electrical signal. When the signaling device is activated, the person at the remotely located musical instrument is alerted to commence playing the instrument. When the specific electrical signal stops, the signaling device is deactivated alerting the person to stop playing the remote musical instrument.

In the first embodiment, the means for converting the set of musical notes into a corresponding set of electrical signals comprises a first electronics circuit. This circuit has means for converting the electrical signals and passing the converted signals to a Radio Frequency (R.F.) transmitter that passes the electrical signals via an R.F. antenna to a corresponding remotely located R.F. receiver that is located in a second electronics circuit. The second electronics circuit has further means for processing the electrical signals and producing a vibrator enabling signal and/or an LED enabling signal that is applied respectively to the vibrator and/or the LED display.

The first electronics circuit further comprises an electronics processor that is connected to a Musical Instrument Digital Interface (MIDI) card, and that is operated by a MIDI software program. The MIDI software program is programmed to only allow the electrical signals corresponding to selected notes of a musical score to be processed and subsequently transmitted into space by the R.F. transmitter.

In the second embodiment, the means for converting the set of musical notes into a corresponding set of electrical signals comprises a first set of cables that pass the musical signals to a keyboard interface. The keyboard interface has means for processing the electrical signals and producing a vibrator enabling signal and/or an LED signal that are applied through a second set of cables to the vibrator and/or the LED display respectively. The first set of cables comprise a set of series connected switches. The only switches that are closed are those that correspond to a set of selected musical notes that will be used by the person playing the handbell.

In the third embodiment, the R.F. transmitter in the transmitting circuit receives an input directly from the electronic keyboard and produces an output that is applied via an R.F. transmitting antenna into space. The R.F. signal is received by an R.F. receiver via an R.F. receiving antenna, where a signal is produced that enables a transistor from where a vibrator enabling signal and/or an LED enabling signal is produced.

In the fourth embodiment, a MIDI processor is utilized to transmit a note-on or a note-off command from a first musical instrument, which is comprised of an electronic keyboard, to a second musical instrument which includes a signaling device. The second musical instrument is comprised of handbells, Belleplate™, chimes or pipes, with handbells being preferred and referred to hereinafter. The signaling device comprises a vibrator and/or an LED display that is integral or external to the second musical instrument. A single, master MIDI processor can be utilized to control an entire handbell choir, which comprises multiple individual handbells. Additionally, a MIDI router/splitter can be utilized to create additional MIDI signals which can be sent to each handbell individually. The MIDI router/splitter is especially effective for large handbell choirs in which there are a large number of handbells that must be signaled.

In the fifth embodiment, an infrared transmitting circuit and an infrared receiving circuit are utilized.

The infrared transmitting circuit produces a digitally encoded infrared signal that corresponds to the note of a specific musical key that is being pressed on an electronic keyboard or the like. The digitally encoded infrared signal is then radiated outward into space.

The infrared receiving circuit is located to receive and decode the digitally encoded infrared signal from the infrared transmitter. The decoded signal is then applied to a signaling device that can consist of an LED display, a vibrator or a combination of both. The signaling device is utilized to alert a bell choir member to ring a particular handbell.

In all five of the above embodiments, the means for signaling each member of a musical bell choir to ring their specific handbell commences when a key of an electronic keyboard is depressed. The depressing of a keyboard key produces a signal that activates a signaling device that alerts each member of the musical bell choir to ring their specific handbell.

As an alternative to a keyboard, the means for signaling can be a pre-recorded device that is preprogrammed to illuminate an individualized signaling device in a desired sequence. Thus, instead of having a musical group leader conveying signals or cues to the musical group members by means of a keyboard, the leader would be replaced by a signaling device that is preprogrammed to provide the same cues. The pre-recorded signaling device can be an electro-mechanical apparatus that is capable of causing electric current to be directed to the signaling device in a predetermined sequence. When MIDI is utilized, a MIDI/Audio sequencing and recording software program, such as Apple Logic Pro/Express, Yamaha Steinberg Cubase SX/SL/SE, or Mark of the Unicorn (MOTU) Digital Performer can be utilized to program a series of MIDI commands to control the signaling device.

As an alternative to an electronic keyboard being the means for supplying a signal, a conventional piano or an organ that is modified to replace its sound-output with electric current that activates the signaling device can be utilized. Also, an xylophone could be modified so that as each xylophone key is struck, an electric current is produced that activates the signaling device.

In the above disclosure, there is a single musical group leader who provides all of the signals or cues. As an alternative, there can be multiple musical group leaders providing the signals or cues. For example, there can be two group leaders, each with their own musical instrument. One leader can play the notes that make up the melody to the song being performed, while the other leader will play the harmony notes. The musical group members will have signaling devices, as previously described, for receiving the signals or cues as to when each member is sound their particular instrument. In this example, each signaling device is wired to receive a signal or cue from either or both of the leaders.

As a further alternative to the above disclosed signaling means the necessary means can be provided by headphones that are worn by each musical group member. The sound in each headphone will be the same: a soft beep or the like audible only to the one specific group member to whom it is direct.

In the above disclosed embodiments, the musical instruments being played by the musical group members are handbells. As an alternative, the musical instruments can be instrument sold under the trademark "Belleplate™". Each Belleplate™ instrument consists of a U-shaped handle that is held in the hand. At the end of one of the legs of the U is attached a flat metal plate. At the end of other leg of the U is attached a gong, mallet or ringer. By squeezing together the two legs of the U-shaped handle, the gong, mallet or ringer impacts against the metal plate, with the result being the production of a single musical note. As with the handbells, the Belleplate™ instruments would be distributed to the members of the musical group so that each member holds an instrument that produces a note that differs from that of each of the other members.

Additionally, each musical group member can hold a series of chimes, pipes or other sound producing objects. As with the handbells, each instrument produces a single note that is distinctive from the notes produced by the similar instruments of the other musical group members. As with the handbells, the sounds produced by these various instruments are in response to individualized signaling means conveyed from a single source, such as the keyboard.

In view of the above disclosure, the primary object of the invention is to produce a musical instrument signaling system that provides signals or cues to individual members of a group of musical instrumentalists as to when each one is to play their specific instrument.

In addition to the primary object of the invention it is also an object to produce a musical instrument signaling system that:

makes as easy as possible (and requiring as little practice time as possible) the giving and receiving of signals or cues to members of a musical group as to when each member is to play their particular instrument, eliminates or at least minimizes the necessity of individual musical group members having to receive signals or cues from memory or from a common musical score, eliminates the need for individual musical group members to use their own mental efforts to determine when each of them is to play their particular musical instrument, provides a way for children with little or no musical background to participate as members of a musical group with little or no practice time or other preparation, can be used with various types of hand-held musical instruments, and is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a first embodiment, a second embodiment, a third embodiment, a fourth embodiment, and a fifth embodiment for a musical instrument signaling system (hereinafter "MISS 10"). All five embodiments utilize an electronic keyboard or the like to produce an alert signal when a key is depressed. The alert signal is received by and signals an individual responsible for playing a musical instrument such as a handbell, to play the bell when the alert signal is received.

Various musical instruments such as an electronic keyboard or a modified xylophone, organ or piano can be utilized to produce the alert signals. However, for the purpose of this disclosure the instrument will be limited to an electronic keyboard. Likewise, the hand-held or struck musical instruments can consist of handbells, Belleplate™, chimes, and pipes. However, for the purpose of this disclosure the musical instrument will be limited to handbells as used by members of a bell choir.

The first embodiment of the MISS 10 is comprised of two major circuits: a transmitting circuit 12 and a receiving circuit 30.

Transmitting Circuit 12

Figure 1A:
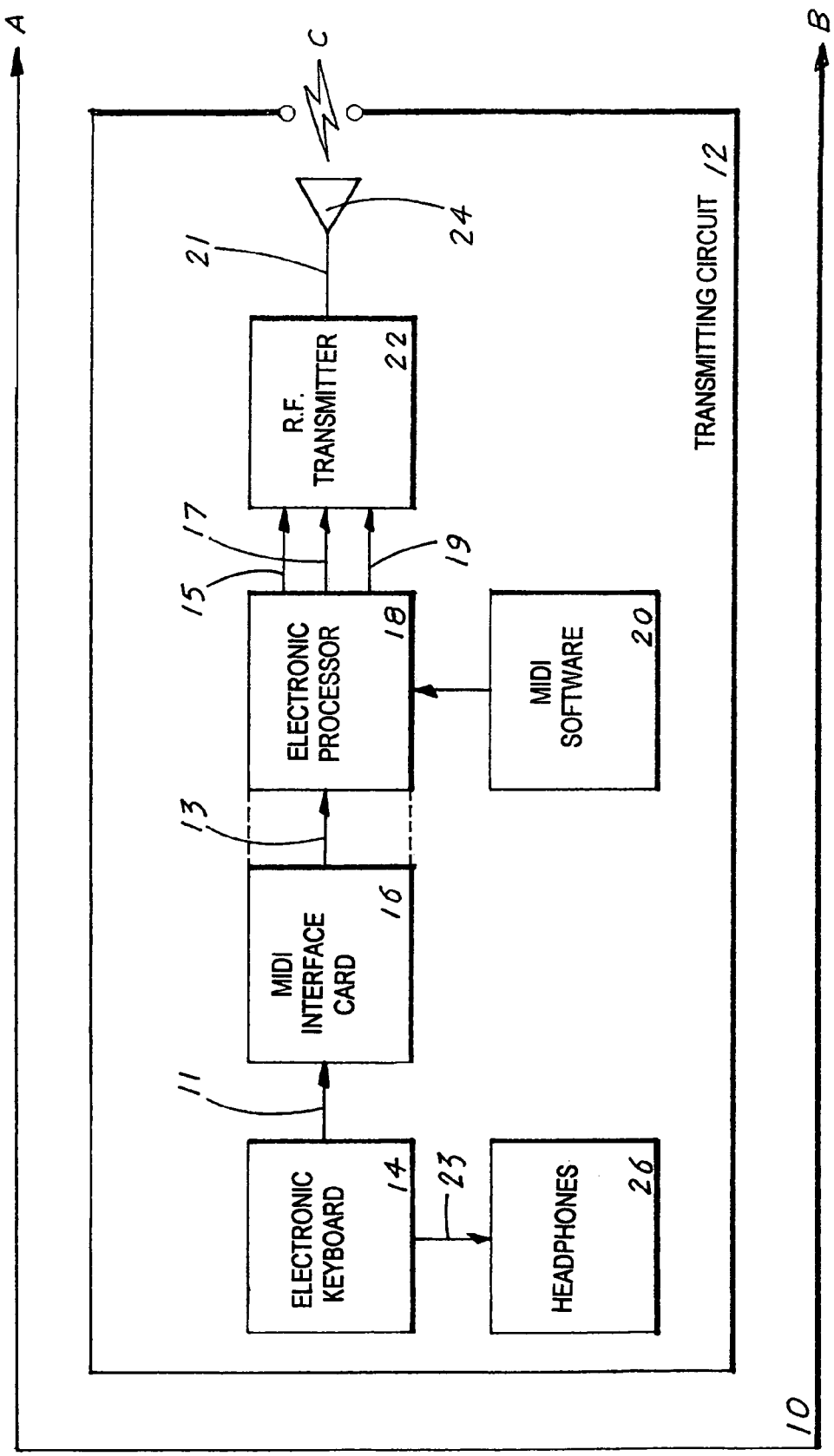
FIG. 1A is a block diagram of the transmitting circuit as configured for the first embodiment of the musical instrument signaling system (MISS).

The transmitting circuit, as shown in FIG. 1A, is comprised of five major elements: an electronic keyboard 14, a MIDI interface card 16, an electronic processor 18, software 20, and an R.F. transmitter 22 connected to a transmitting antenna 24. The term MIDI is an acronym for Musical Instrument Digital Interface. MIDI provides a standard protocol for communication between different electronic devices, such as between the electronic keyboard 14 and the electronic processor 18.

The electronic keyboard 14, as shown in FIG. 1A, is comprised of a standard electronic keyboard that includes a MIDI output. When a key on the electronic keyboard is depressed, a MIDI output signal 11 is produced that corresponds to the note associated with the depressed key. The MIDI output signal 11 contains various digital data; for this disclosure however, only three coded digital data are required: the note selected, when the note starts (note on), and when the note stops (note off). As shown in FIG. 1A, the electronic keyboard 14 can be designed to include a means for producing a headphone signal 23. The signal 23 allows a player to hear what note is being played on the electronic keyboard 14 through a pair of headphones.

The MIDI interface card 16, as shown in FIG. 1A, which can be designed to be a part of the electronic processor 18, is applied the MIDI output signal 11 and produces a corresponding coded digital signal 13 that is further processed by the processor 18. The electronic processor 18 can be comprised of a microprocessor, a custom-designed and dedicated microcontroller, or a personal computer (PC) that can be operated by one of many MIDI software programs 20 that are readily available and listed in the fourth embodiment. The electronic processor 18 decodes the coded digital signal 13 applied from the MIDI interface card 16 and produces a set of three signals: a decoded note signal 15, a decoded note start signal 17, and a decoded note stop signal 19. Each note is assigned a unique digital code by the MIDI software program 20. The software program 20 is programmed to only allow the notes applicable to a specific musical score that are to be played by a bell ringer to be activated and transmitted.

The R.F. transmitter 22, as also shown in FIG. 1A, operates with a set frequency and has means for receiving the three decoded signals 15,17,19 and modulating the signals onto the carrier frequency of the R.F. transmitter 22. The output of the transmitter 22 is a corresponding R.F. signal 21 that is applied into space by the transmitting antenna 24.

Receiving Circuit 30

Figure 1B:
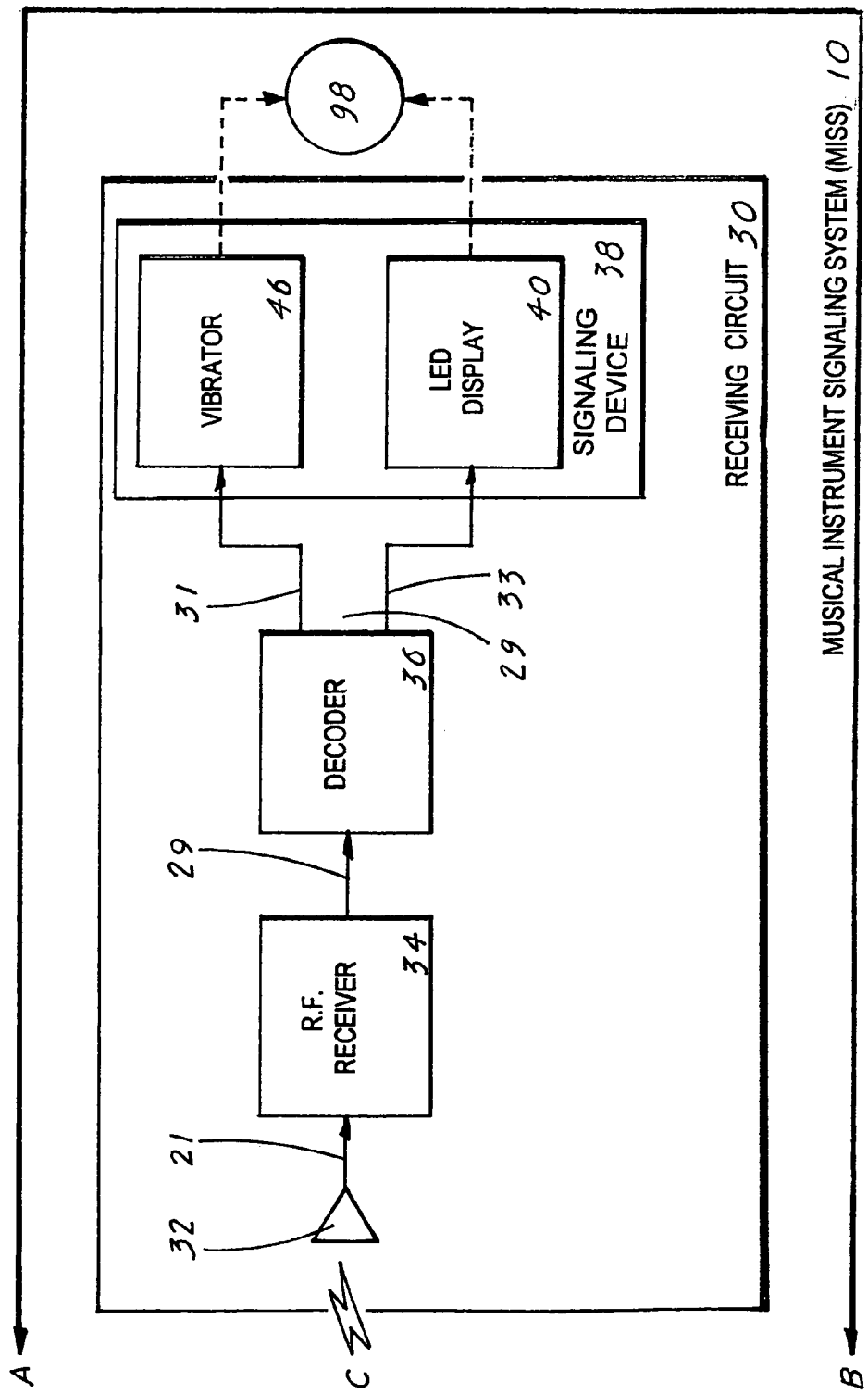
FIG. 1B is a block diagram of the receiving circuit as configured for the first embodiment of the MISS.
Figure 8:
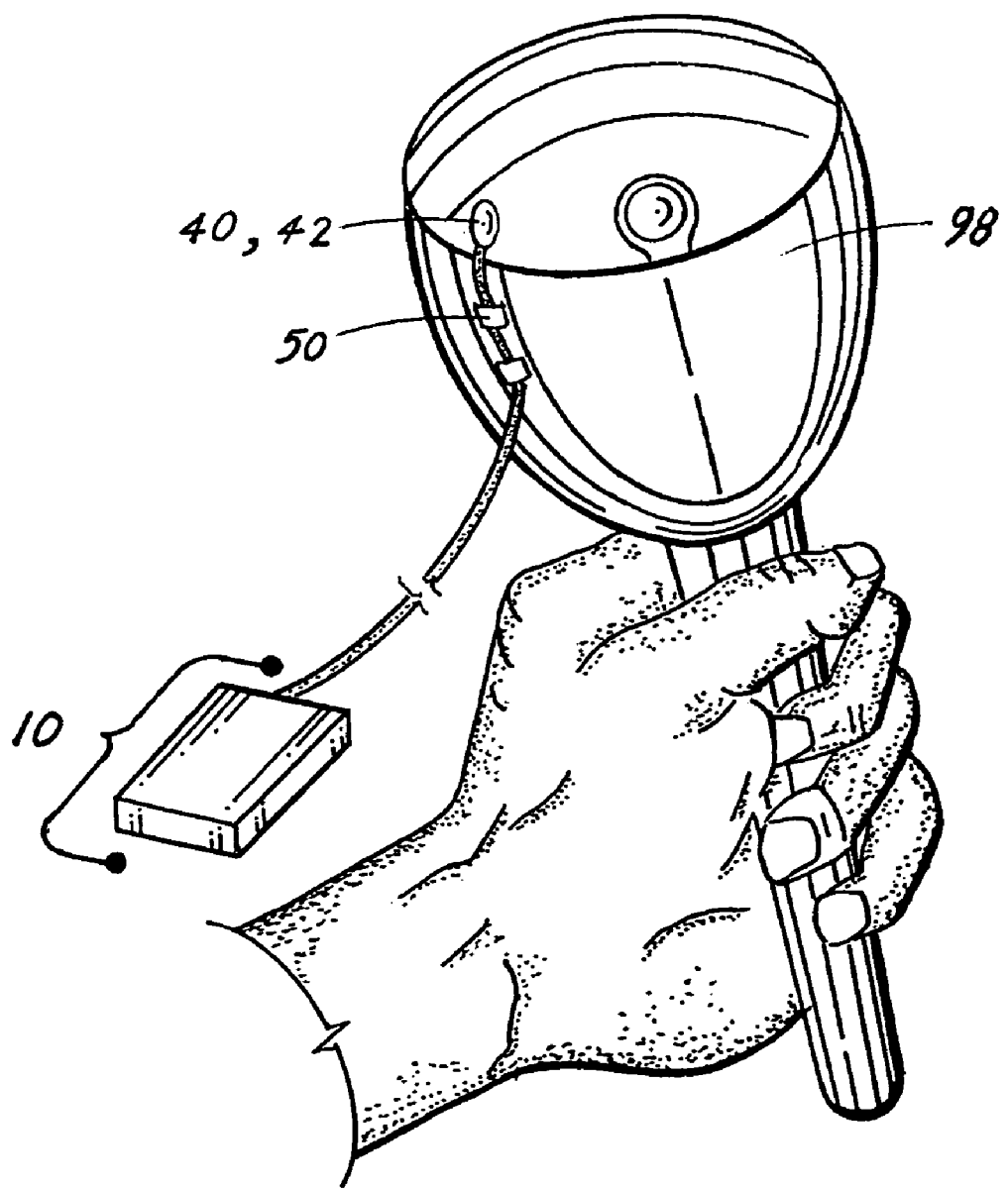
FIG. 8 is a perspective view of a hand-held bell that utilizes a signaling device consisting of an LED display that is attached directly to the hand-held bell.
Figure 9:
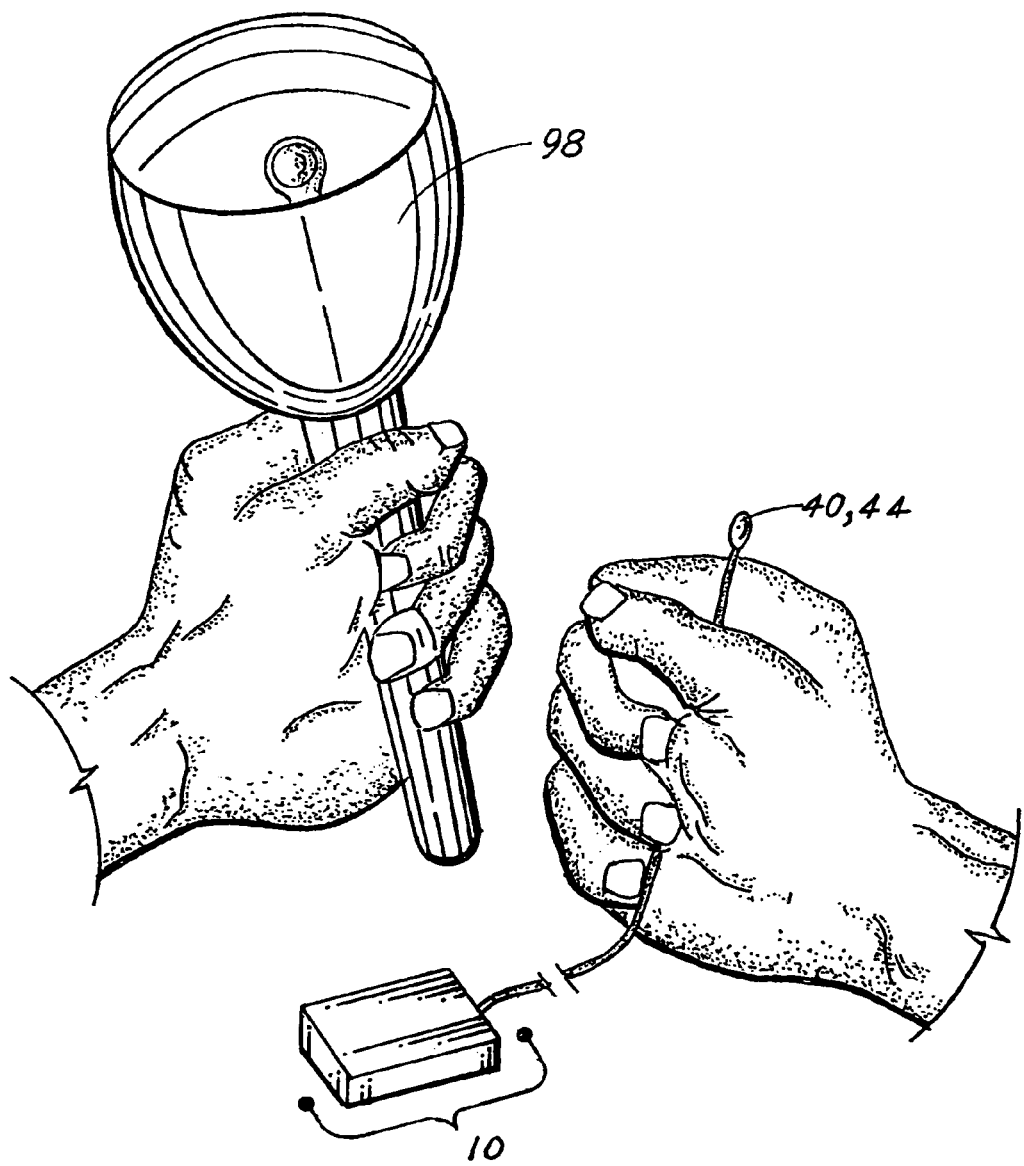
FIG. 9 is a perspective view of hand-held bell that utilizes a signaling device consisting of an LED display that is held by the hand that is not holding the bell.
Figure 10:
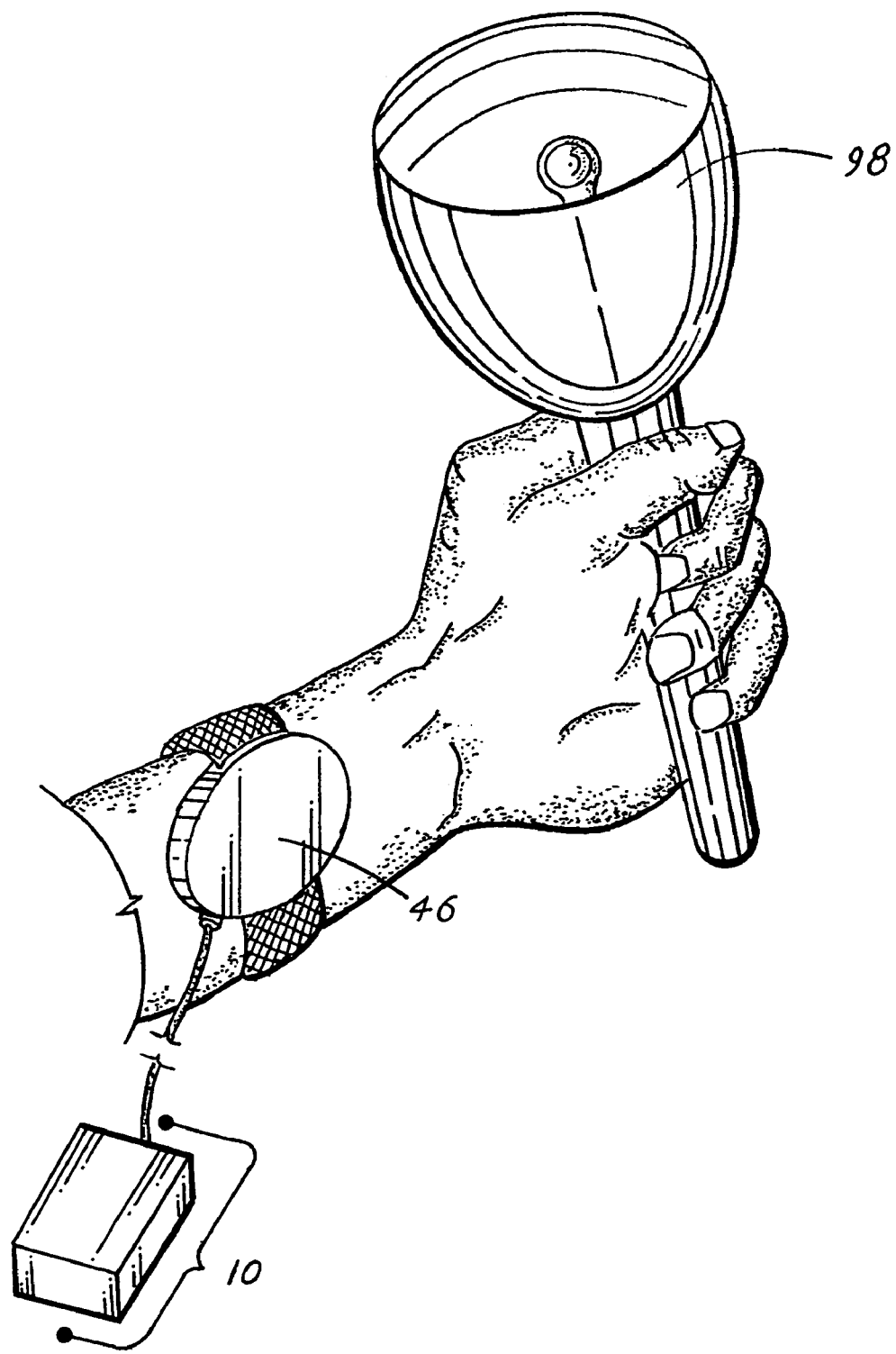
FIG. 10 is a perspective view of hand-held bell that utilizes a signaling device consisting of a vibrator that is attached to a body part such as a wrist.

The receiving circuit 30, as shown in FIG. 1B, is comprised of three major elements: an R.F. receiver 34, a decoder 36, and a signaling device 38 that consist of an LED display 40 or a vibrator 46. The signaling device signals a bell ringer when to ring or stop ringing the bell 98. The LED display 40,42 can be attached directly to the hand-held bell 98, as shown in FIG. 8, or the LED display 40, 44 can be held by the hand that is not holding the bell 98, as shown in FIG. 9. The vibrator 46 is attached to a body part such as a wrist, as shown in FIG. 10. There can be a total of eighty-eight signaling devices 38, (corresponding to the maximum eighty-eight keys of an electronic keyboard), that are tuned to the specific R.F. frequency of the transmitted R.F. signal 21. All of the eighty-eight receiving circuits 30 are identical, with the exception that each receiving circuit 30 has a different decoder 36 that is set to recognize a specific musical note.

The transmitted R.F signal 21 produced by the R.F. transmitter 22 is applied to the R.F. receiver 34 via the receiving antenna 32. The R.F. receiver 34 is a fixed-frequency receiver that is tuned to the transmitted frequency of the corresponding R.F. transmitter 22. The R.F. receiver removes the carrier frequency and produces a coded note signal 29 that is unique and that corresponds to the note being depressed on the electronic keyboard 14.

When the decoder 36 recognizes the coded note signal 29, it produces a vibrator enabling signal 31 or an LED enabling signal 33. The vibrator 46 is typically of the type used in cell phones or pagers, and is known in the industry as a "silent ringer". When either the vibrator 46 or the LED display 40 is active, the bell choir member rings their specific bell 98. When the vibrator 46 or the LED display 40 are no longer active, the choir member stops ringing their bell 98.

In the event that two or more keys are simultaneously depressed on the electronic keyboard 14, the electronic processor 18 will continuously produce and pass a serial coded signal (not shown) that corresponds to all the keys being depressed. As each key is no longer depressed, that code will no longer be transmitted, thus deactivating the vibrator 46 and the LED display 40.

The receiving circuit 30 is battery operated and can be built into a small package about half the size of a standard "pager". It can also be built into a device small enough to be worn like a wrist watch, but the circuitry would need to be custom made to fit a package that size. As previously mentioned, the number of receiving circuits 30 must correspond to the number of keys on the keyboard. Each enclosure of the "hand-held" receiving circuit 30 is preferably marked with the musical note that the circuit is designed to recognize.

Figure 2:
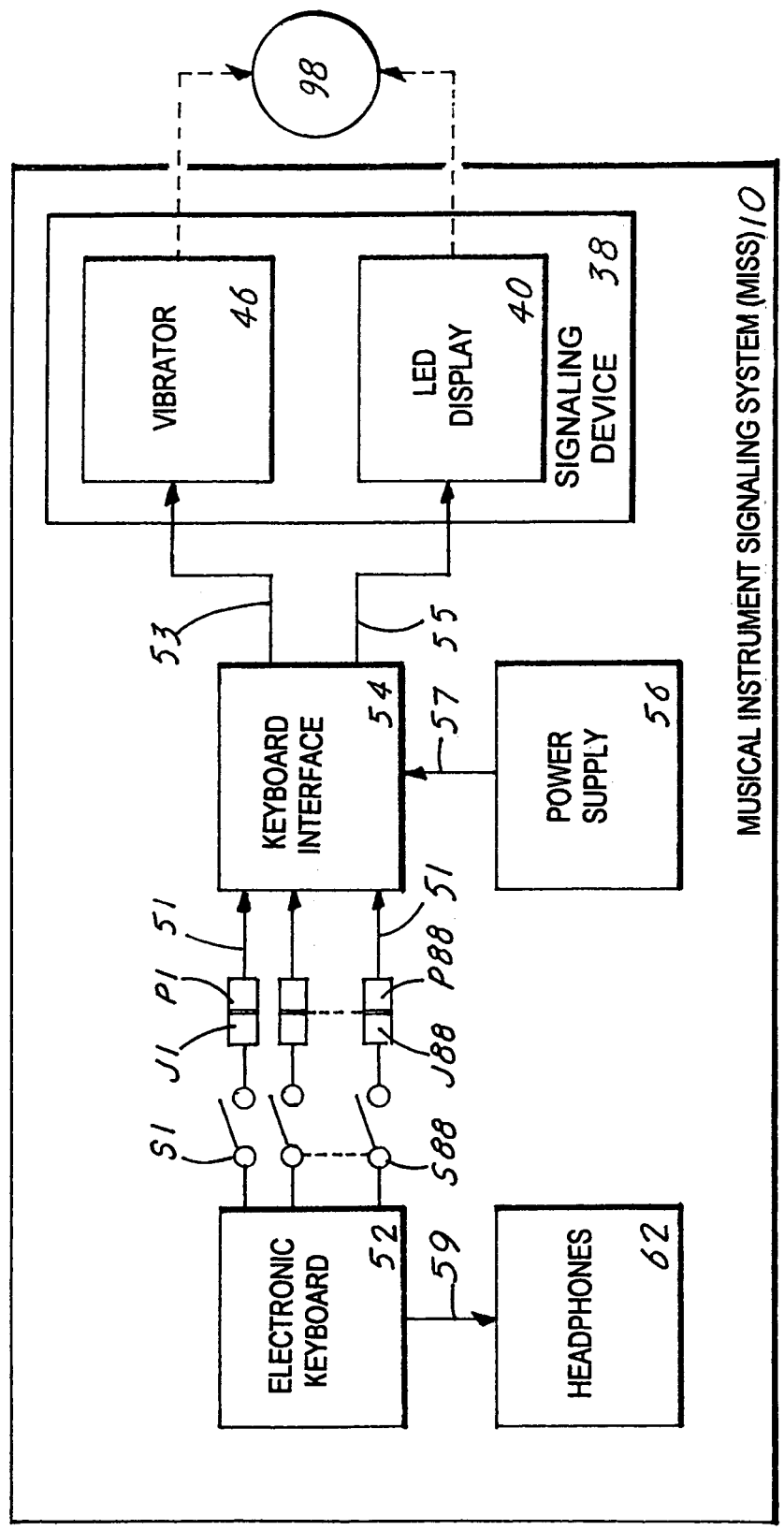
FIG. 2 is a block diagram of the second embodiment of the MISS.
Figure 3:
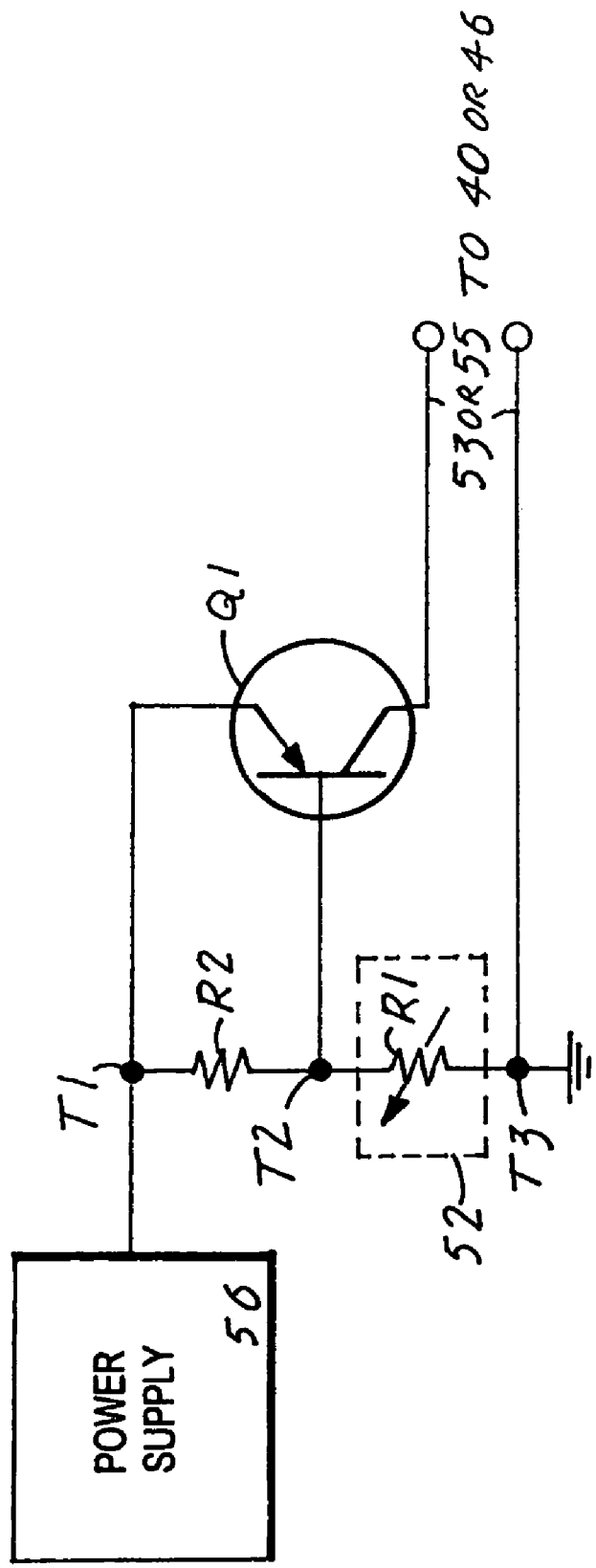
FIG. 3 is a schematic diagram of a keyboard interface circuit utilized in the second embodiment of the MISS.

The second embodiment of the MISS 10, as shown in FIGS. 2 and 3, is a hard-wired design that is comprised of four major elements: an electronic keyboard 52, a keyboard interface 54, a power supply 56, and a signaling device 38 that can consist of a vibrator 46, or an LED display 40. The signaling device 38 signals a bell ringer when to ring or stop ringing the bell 98. The LED display 40,42 can be attached directly to the hand-held bell 98, as shown in FIG. 8, or the LED display 40 can be held by the hand that is not holding the bell 98, as shown in FIG. 9. The vibrator 46 is attached to a body part such as a wrist, as shown in FIG. 10.

The electronic keyboard 52, as shown in FIG. 2, for the purpose of this disclosure has a total of eighty-eight keys that produce a total of eighty-eight notes. Attached to the output of each of the eighty-eight keyboard keys is a switch S1-S88 to which is attached a receptacle J1-J88. The number of switches that are closed is dependent upon the number of keys (notes) that will be used by the bell ringers during a particular musical performance. For example, if the musical performance calls for bell ringer to play a bell when the keyboard player strikes the notes A, B and E, only the switches connected to the A, B and E notes will be closed and a corresponding plug attached. The attached plug (P1-P88) produces a keyboard output signal 51 that is applied to the keyboard interface 54. The keyboard can also include a headphone enabling signal 59 that is connected to a pair of headphones 62.

The keyboard interface 54 includes means for receiving the keyboard's eighty-eight output signals 51 and providing a corresponding vibrator enabling signal 53 or an LED enabling signal 55. Power to the keyboard interface 54 is applied through a power cable 57 connected to a power supply 56, as shown in FIG. 2.

The vibrator enabling signal 53 is passed to the vibrator 46 and likewise, the LED enabling signal 55 is applied to the LED display 40, as also shown in FIG. 2. Power to the vibrator 46 and/or the LED display 40 is provided by the power supply 56 via the keyboard interface 54. In practice, when a key is depressed on the electronic keyboard 52, the vibrator 46 or the LED display 40 corresponding to the particular key will be activated, and will remain activated until the key is no longer depressed, at which time they are deactivated. The vibrator 46 is typically of the type used in cell phones or pagers, and is known in the industry as a "silent ringer". Thus, when the vibrator 46 or the LED display 40 are active, the bell choir member rings their specific hand-held bell 98. When the vibrator 46 or the LED display 40 are no longer active, the choir member stops ringing the bell 98.

The electronic keyboard 52 is modified by attaching to the upper or lower surface of each key of the keyboard 52 a variable resistor R1 (pressure sensitive membrane), as shown in FIG. 3. The variable resistor R1 has a negative coefficient that allows the resistance of resistor R1 to go down when pressure on a key is applied.

The keyboard interface 54 includes a resistor R2 and a transistor Q1, as also shown in FIG. 3. The resistor R2 is connected in series with the resistor R1 to form a voltage divider having a positive terminal T1, a center tap terminal T2, and a circuit ground terminal T3. The terminal T1 is connected to the emitter of the transistor Q1, and the terminal T2 together with the positive end of resistor R1 is connected to the base of the transistor Q1. The ground end of the resistor R1, together with a lead from the collector of transistor Q1, are connected to the vibrator 46 or the LED display 40 through the cable passing the vibrator enabling signal 53 or the LED enabling signal 55. The resistor R1 also functions as a current limiting resistor to the base of the transistor Q1.

When no key on the electronic keyboard 52 is depressed, the voltage on the base lead of the transistor Q1 is at the voltage of the power supply 56, thus causing the transistor Q1 to remain off.

When a key on the electronic keyboard 52 is depressed, the resistance of the resistor R1 goes down, which causes the voltage being applied to the base of the transistor Q1 to drop to near zero volts, enabling the transistor Q1. When the transistor Q1 is enabled a voltage appears on the cable passing the signal 53 onto the vibrator 46 and/or the signal 55 is passed onto the LED display 40, causing them to become active. The voltage will remain applied as long as a key is depressed. When a key is released, the transistor Q1 turns off, causing the vibrator 46 or the LED display 60 to also turn off.

Figure 4A:
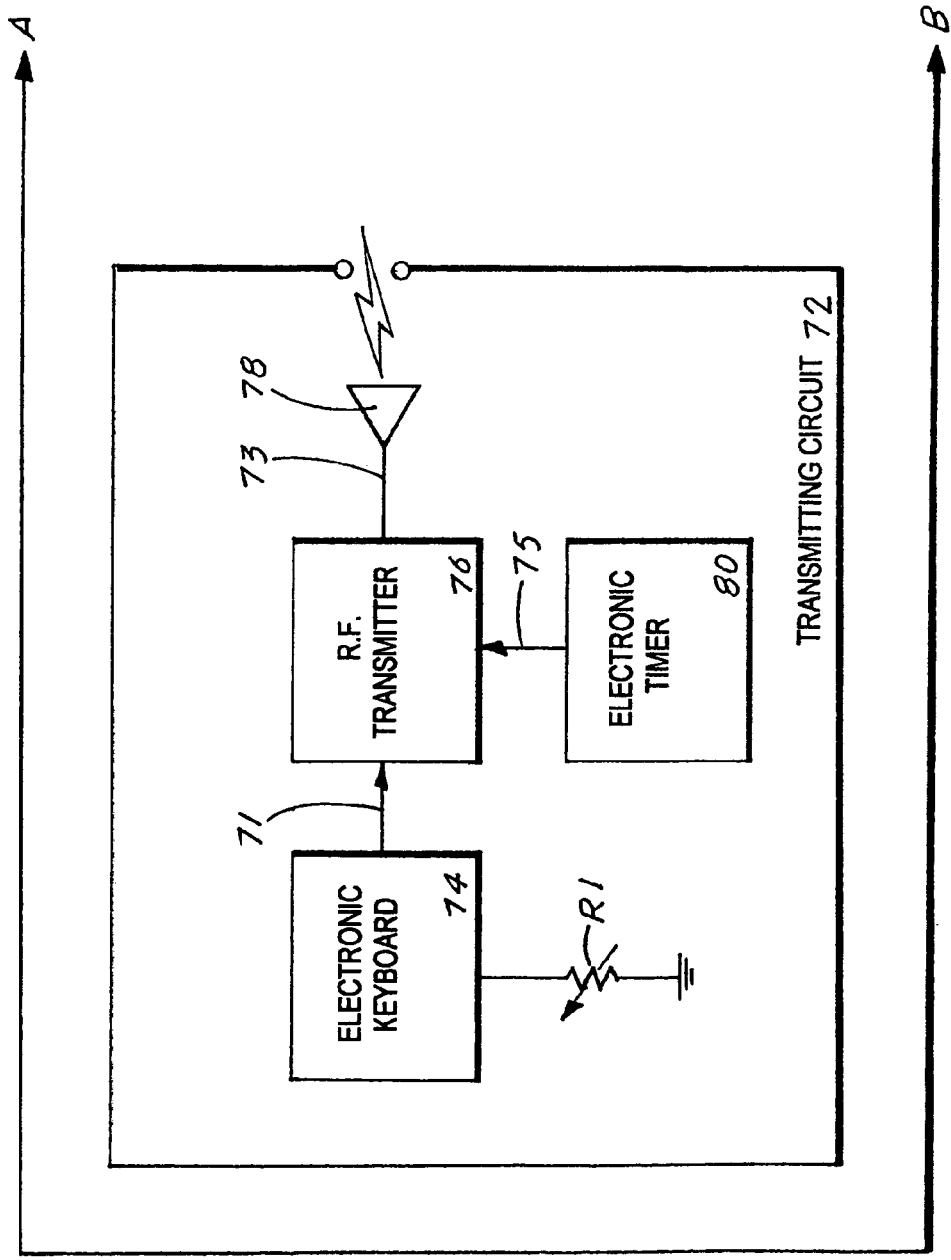
FIG. 4A is a block diagram of the transmitting circuit as configured for the third embodiment of the MISS.
Figure 4B:
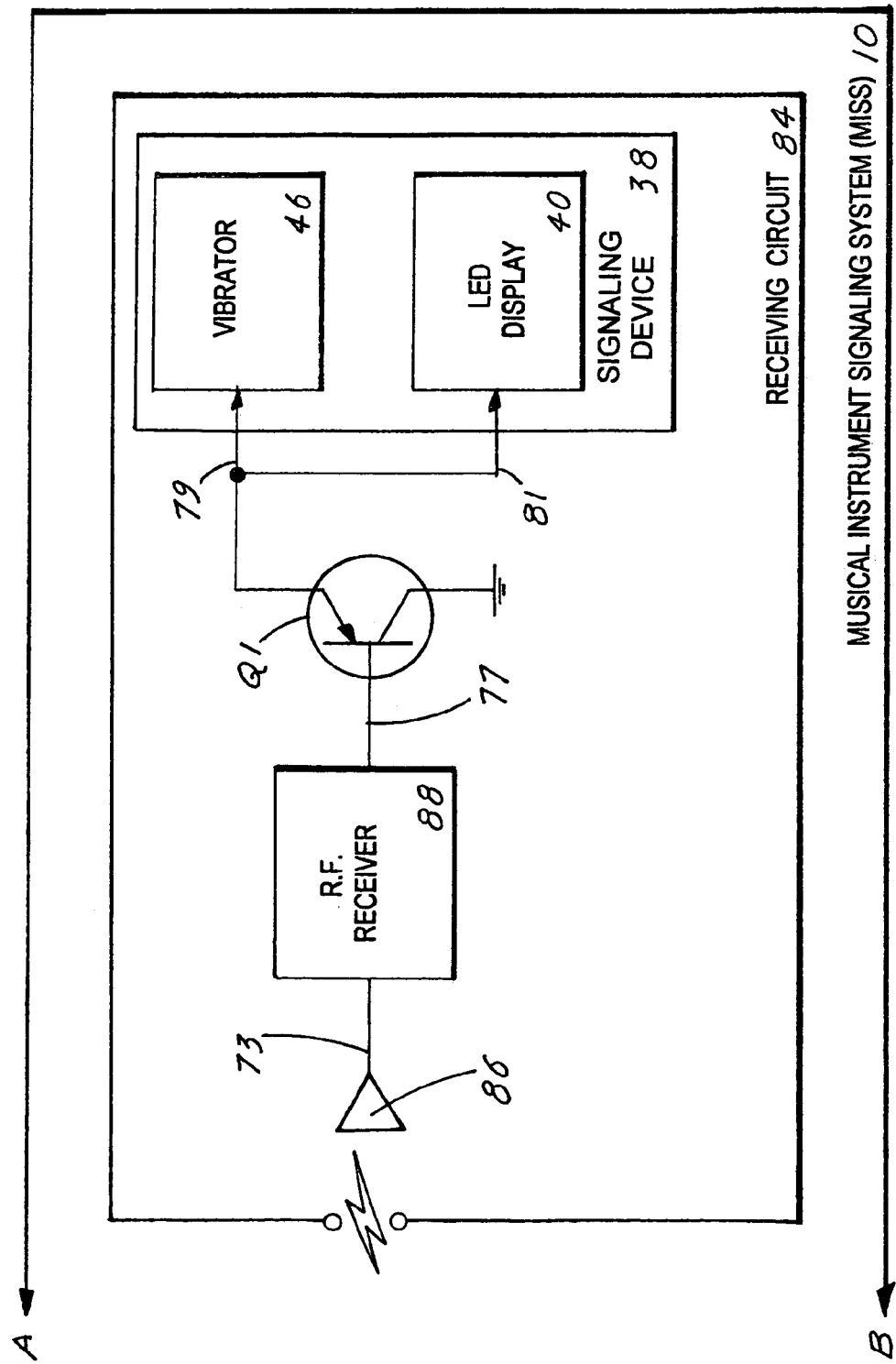
FIG. 4B is a block diagram of the receiving circuit as configured for the third embodiment of the MISS.

The third embodiment of the MISS 10, as shown in FIGS. 4A and 4B, is comprised of two major elements: a transmitting circuit 72 and a receiving circuit 84.

Transmitting Circuit 72

The transmitting circuit 72 is further comprised of three major elements: an electronic keyboard 74, a set of R.F. transmitters 76 connected to a transmitting antenna 78, and an electronic timer 80.

The electronic keyboard 74, as shown in FIG. 4A, for the purpose of this disclosure has a total of eighty-eight keys that produce a total of eighty-eight notes. The standard electronic keyboard is modified by attaching to the upper or lower surface of each key, by an attachment means, a pressure sensitive resistor R1. These resistors are comprised of thin flexible sheets that can be procured in various lengths and widths.

When a key with the attached resistor R1 is depressed, a keyboard output signal 71 corresponding to a specific note is produced.

There are eighty-eight R.F. transmitters 76 which correspond to the number of keys on the electronic keyboard 74. Each R.F. transmitter 76, as shown in FIG. 4A, has a first input, a second input and an output. The first input is applied the keyboard output signal 71. Each R.F. transmitter 76 is also tuned to the note that corresponds to the note that is produced by the specific key connected to the R.F. transmitter 76.

The second input of the eighty-eight R.F. transmitters 76 is applied a timing signal 75 that is produced by the electronic timer 80. The timer 80 is preferably comprised of a single NE555 integrated circuit, which is configured as an astable unit that consists of a continuous high-frequency square wave. When a key on the electronic keyboard 74 is depressed, the resistance value of the pressure sensitive resistor R1 for the specific key drops to nearly zero turning on its respective R.F. transmitter 76. The timing signal 75 is modulated by the respective R.F. transmitter 76, which then produces at its output an R.F. signal 73 that is transmitted into space through an R.F. transmitting antenna 78.

Receiving Circuit 84

The receiving circuit 84, as shown in FIG. 4B, is comprised of four major elements: a receiving antenna 86 connected to an R.F. receiver 88, a transistor Q1, and signaling device 38 that consists of a vibrator 46, or an LED display 40.

The transmitted R.F. signal 73 from the R.F. transmitter 76 is picked up by a set of eighty-eight receiving antennas 86 connected to the R.F. receiver 88. However, only the R.F. receiver 88 that is tuned to the transmitted frequency will be activated and produce a transistor enabling signal 77, as shown in FIG. 4B.

The transistor enabling signal 77, which is applied to the base of transistor Q1, causes the transistor Q1 to become enabled. The enabled transistor Q1 then produces a vibrator enabling signal 79 that activates the vibrator 46, or an LED enabling signal 81 that activates the LED display 40. When the depressed key is released, the value of the pressure sensitive resistor R1, as shown in FIG. 4A, increases thereby causing the respective R.F. transmitter to turn off. Thus, the R.F. receiver 88 associated with the deactivated R.F. transmitter 76 will no longer receive the transmitted R.F. signal, causing transistor Q1 to turn off, which in turn deactivates the vibrator 46 and/or the LED display 40. The deactivated vibrator 46 or the LED display 40 serve to inform a remotely located bell ringer to stop ringing the bell. In this third design, once the specific keys (notes) that will be used by the bell ringers are known, the R.F. transmitter 76 not associated with the specific notes are turned off. Also, the receiving circuits 84 that will not be utilized are not given to the bell ringers.

The fourth embodiment of the MISS 10 is comprised of two major elements: a first musical instrument 104 and a second musical instrument 112.

Figure 5:
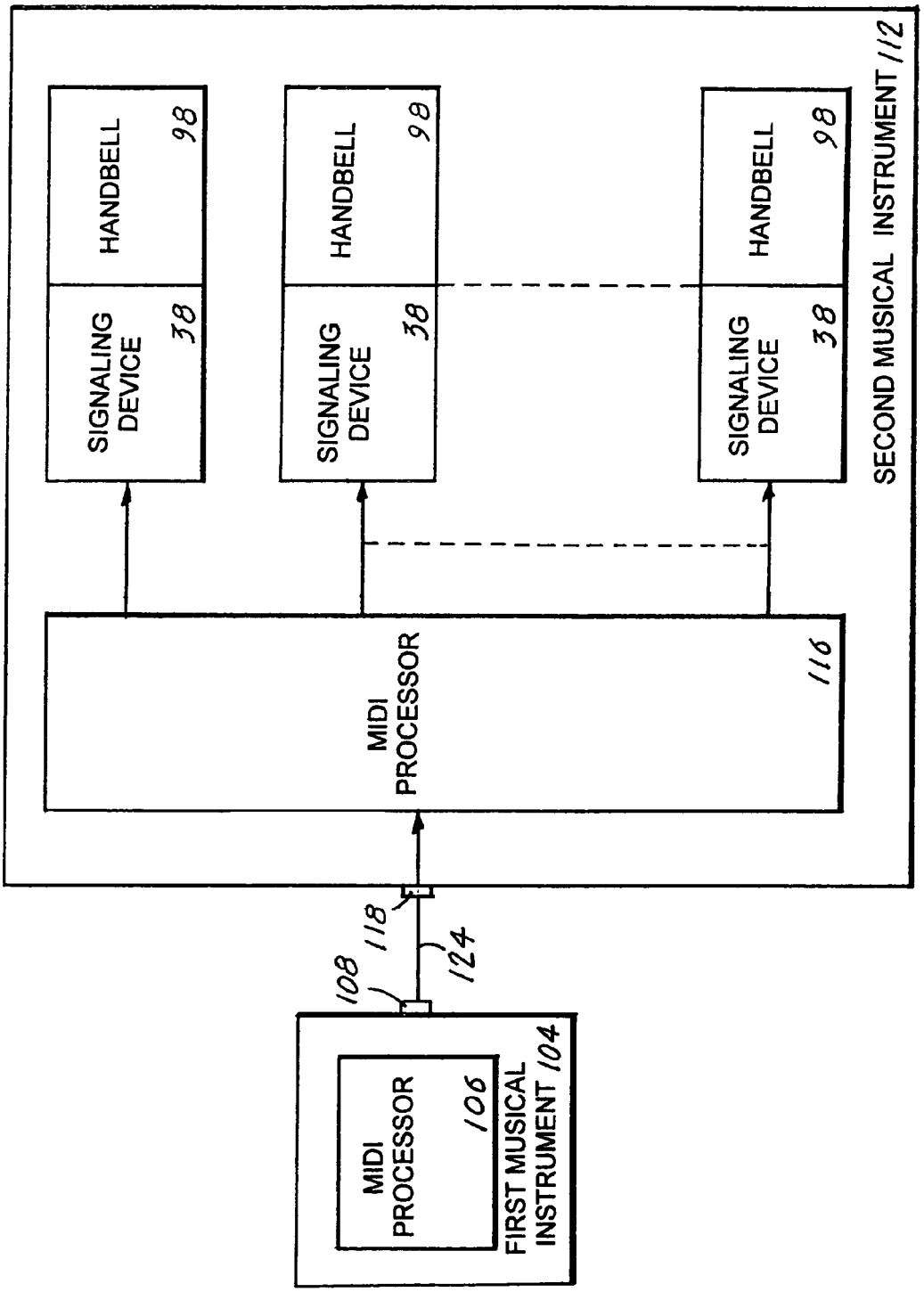
FIG. 5 is a block diagram of the fourth embodiment that utilizes a single master MIDI processor which controls all of the handbells in a set of handbells.

The first musical instrument 104, as shown in FIG. 5, is preferably comprised of an electronic keyboard, and includes a MIDI processor 106 having a MIDI output 108. The second musical instrument 112 can be comprised of set of handbells, Belleplate™, chimes or pipes. (Hereinafter only handbells 98 will be referred to). Although there are a plurality of handbells 98 in the set, there is only a single master MIDI processor 116 which controls all of the handbells 98 in the set. The MIDI processor 116 has a MIDI input 118, as shown in FIG. 5. Each handbell 98 also includes a signaling device 38 which is comprised of a vibrator 46 or an LED display 40. Please note that while the signaling device 38 can be located separate from the second musical instrument 112, however, for the purpose of this fourth embodiment the signaling device 38 will be described and shown as an integral element of the second musical instrument 112.

As shown in FIG. 5, a MIDI cable 124 is utilized to connect the MIDI output 108 on the first musical instrument 104 to the MIDI input 118 on the second musical instrument 112.

The fourth embodiment of the MISS 10 functions by utilizing the inherent capability of a MIDI processor to transmit data and/or commands.

MIDI operates according to a protocol known as Running Status. The Running Status is comprised of two elements: a status byte and a data byte. The status byte determines the state of a MIDI command—whether the command is ON or OFF. The data byte determines the amount or level of the command. For example, if a person wishes to increase the volume of a MIDI device, they will use the status byte to initiate the volume increase, and the data byte to specify how much the volume will increase. These commands are programmed by a person into a MIDI controller. The MIDI device that is receiving the commands will then perform the necessary actions to accomplish the commands. There are sixteen channels that can be transmitted between each MIDI input and output, and each of the sixteen channels can utilize one hundred twenty-seven commands. When the initial MIDI specification was developed in the early 1980's, the designers anticipated additional commands that would be developed and/or required in the future, so not all of the one hundred twenty-seven commands are assigned a particular function. Some examples of MIDI commands are: number 1—modulation, number 65—portamento, and number 76—vibrato rate.

As a result of MIDI's inherent capabilities, a person can program a MIDI device to perform many different commands. For the purpose of this invention, a person would simply have to program an ON or OFF command for each key on the electronic keyboard. Each of the handbells 98 would be similarly programmed to receive on a single MIDI command number to activate or de-activate the signaling device 38 upon reception of the MIDI command. Therefore, when a person plays an A-sharp key, that key will send a signal to a single handbell 98, thereby informing the person who is holding the handbell 98 that it is time to ring the handbell.

Figure 6:
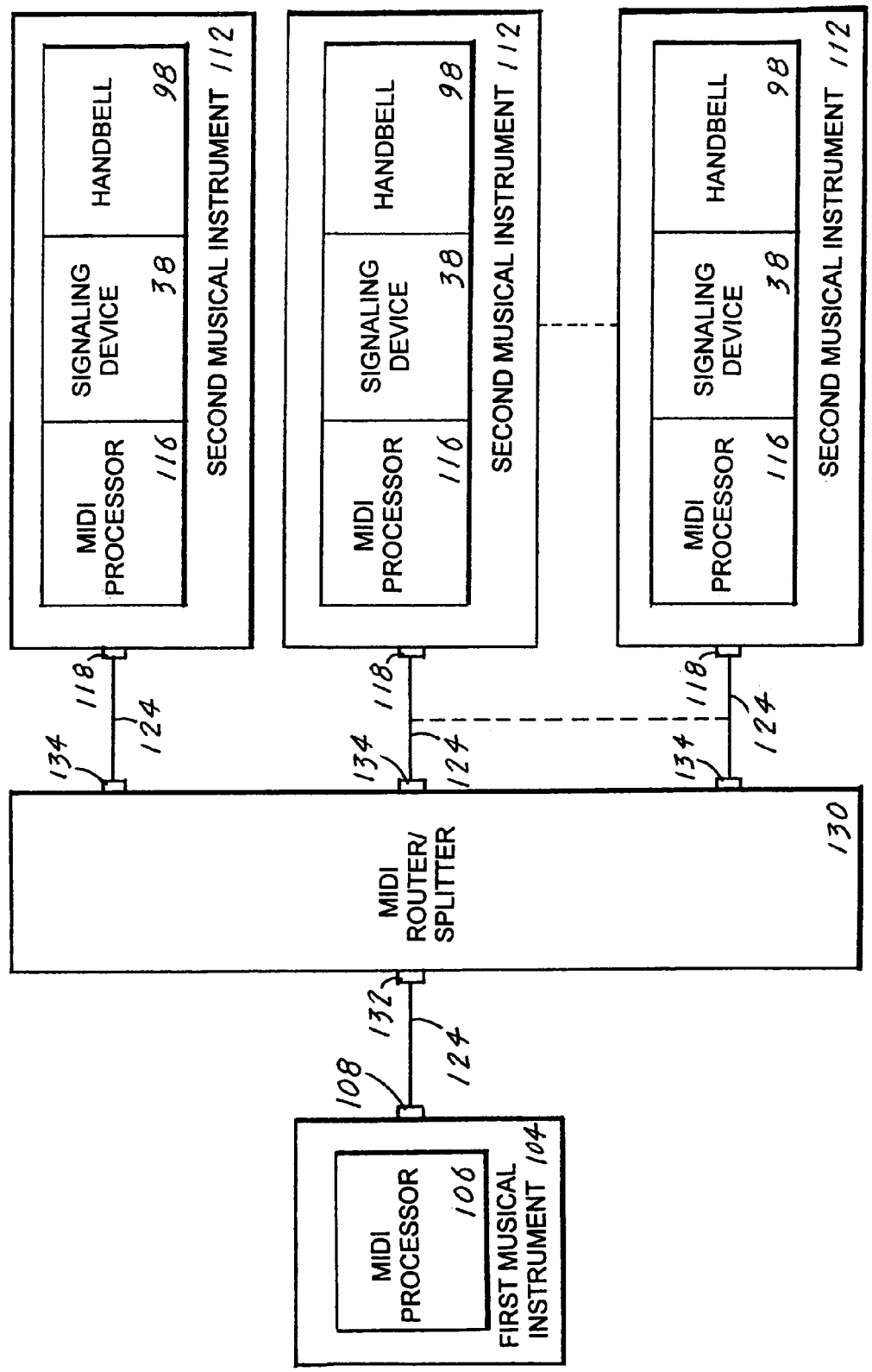
FIG. 6 is a block diagram of the fourth embodiment that utilizes a MIDI router/splitter which is designed to receive a single MIDI input and to create multiple MIDI outputs.

In a similar design, a MIDI router/splitter 130 can be utilized, as shown in FIG. 6. The MIDI router/splitter 130 is designed to receive a single MIDI input 132 and create multiple MIDI outputs 134. As shown in FIG. 6, for illustrative purpose only, the MIDI router/splitter 130 is shown with three separate MIDI outputs 134 from the single MIDI input 132, which would be applicable for a handbell choir having three handbells 98. The output 134 of the MIDI router/splitter 130 is applied via a cable 124 to an input 118 on a second musical instrument 112 that includes a MIDI processor 116, a signaling device 38 and a handbell 98.

The MIDI routers/splitters 130 come in many designs and configurations, and can include any number of inputs and/or outputs. Companies such as MIDI Technology, M-Audio and JL Cooper each provide several models, and it is also possible to have a custom MIDI router/splitter made that is designed for a specific purpose. This method utilizes significantly more MIDI cables 124 than the previous method since a single cable must be utilized for each channel that the MIDI input channel is split into. One of the benefits to using a MIDI router/splitter 130 is that the data flow on a single MIDI cable 124 can be significantly reduced. Like all digital data transfer mediums, a MIDI cable will operate with greater accuracy and consistency when there is less information being transmitted. The most significant benefit to using a MIDI router/splitter 130 is that a larger number of signals can be sent to each handbell individually, which is important for large handbell choirs.

Although programming a MIDI device to transmit and/or receive is not difficult, it does require a certain level of skill and knowledge of the principles and functionality. An additional method of programming a MIDI keyboard to control a set of handbells 98 utilizes MIDI software. As previously stated, MIDI itself has an inherent programming protocol, but if desired a person could also use an external MIDI software program that functions in combination with a computer. These programs are typically referred to as Audio Recording and MIDI Sequencing Programs and by utilizing a MIDI keyboard in conjunction with a MIDI-interfaced computer equipped with the software, a person can program the necessary commands.

Some examples of these programs are: Apple Logic Pro/Express, Yamaha Steinberg Cubase SX/SL/SE, and Mark of the Unicorn (MOTU) Digital Performer. Again, these are just examples—there are a variety of programs available that range from the simplistic to complex. While these MIDI/Audio software programs are primarily designed to allow a person to record and manipulate/edit MIDI and Audio data quickly and easily, they can also be used to program external MIDI controllers. And, again, while they would perform the necessary functions, the use of programs such as these might be considered overkill for a simple application such as that required by the instant invention.

The fifth embodiment of the MISS 10 is comprised of two major elements: an infrared transmitting circuit 140 and an infrared receiving circuit 142. The two circuits function in combination with an electronic keyboard having a plurality of keys, and a bell choir member that is assigned to ring a handbell that corresponds to a particular musical key.

Infrared Transmitting Circuit 140

Figure 7A:
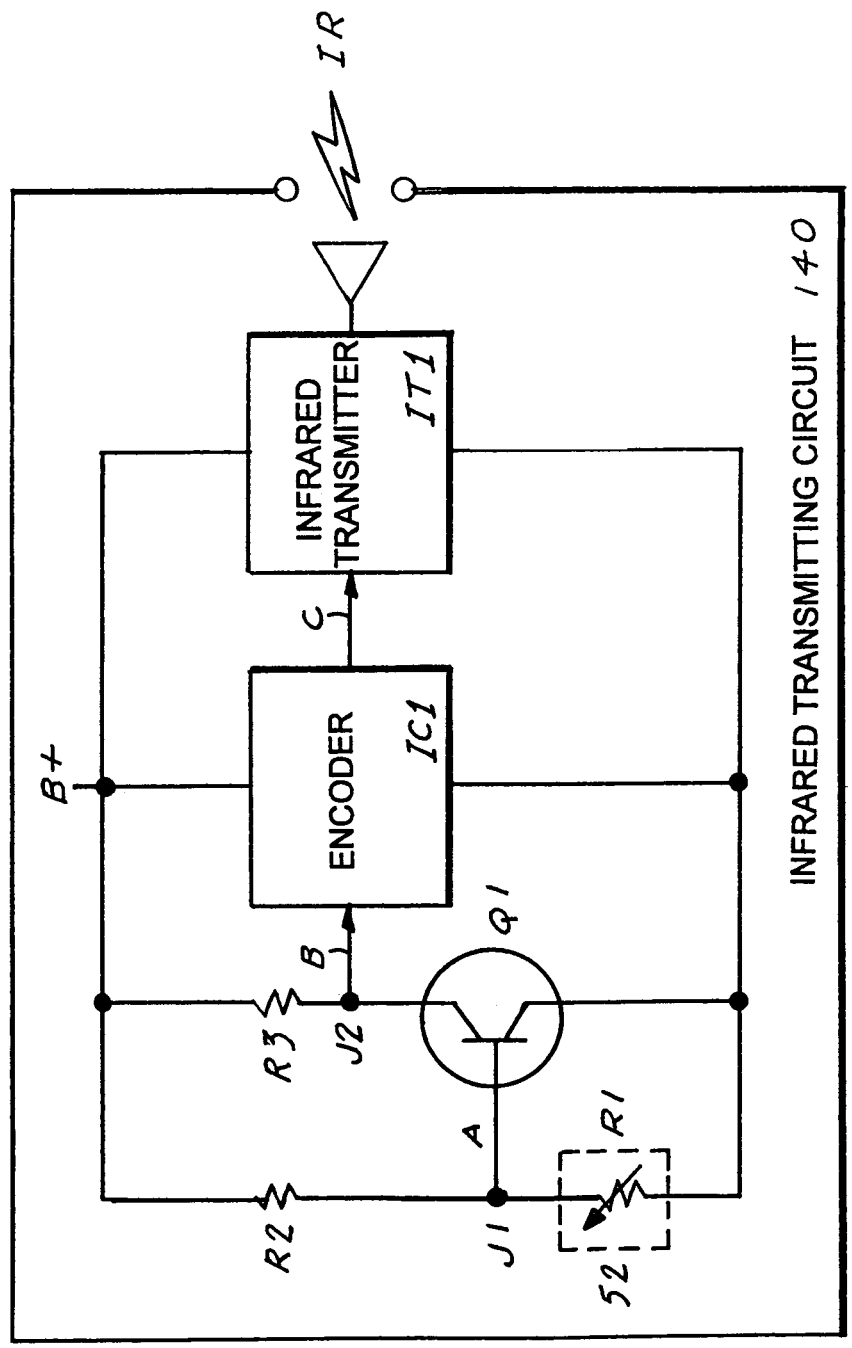
FIG. 7A is a block diagram of the fifth embodiment showing an infrared transmitting circuit.

The infrared transmitting circuit 140, as shown in FIG. 7A, is comprised of a voltage divider, a PNP transistor Q1, a resistor R3, an encoder IC1, and an infrared transmitter IT1.

The voltage divider consists of a pressure sensitive resistor R1 and a series resistor R2. The pressure sensitive resistor R1 is attached by an attachment means, to the lower surface of each key of the keyboard 52, and has a first end connected to a junction J1 and a second end connected to circuit ground. The pressure sensitive resistor R1 has a peel and stick surface that comprises the means for attaching the resistor to the lower surface of each key.

The resistor R2 has a first end connected to a positive voltage B+, and a second end connected to the junction J1. From the junction J1 is produced a positive voltage A which is set by the voltage divider, as shown in FIG. 7A. The B+ voltage can range between 5-volts d-c to 12-volts d-c, with a voltage of 9-volts preferred because it can be supplied by a readily available 9-volt battery.

The PNP transistor Q1 has a base that is connected to the positive voltage A applied from the junction J1, which keeps transistor Q1 initially disabled. The emitter of transistor Q1 is connected to a junction J2 from where an ON-OFF digital signal B is produced, and the collector of Q1 is connected to circuit ground. The resistor R3 which functions as a current limiting resistor, has a first end connected to B+ and a second end connected to the junction J2.

The encoder IC1 has a first input that is applied the ON-OFF digital signal B, a second input connected to B+, a third input connected to circuit ground, and an output consisting of a digital signal C.

The final element of the transmitting circuit 140 is the infrared transmitter IT1 which includes an internal driving transistor and an infrared diode. The infrared transmitter IT1 has a first input that is applied the digital signal C, a second input that is connected to B+, a third input that is connected to circuit ground and an output consisting of a digitally encoded infrared IR signal.

The initial voltage present at the junction J1 keeps the transistor Q1 and the encoder IC1 turned off. When a key on the keyboard is pressed, the resistance of the pressure sensitive resistor R1 drops, thereby causing the voltage at the junction J1 to also drop which then turns on the transistor Q1. The enabled transistor Q1 allows the voltage at the emitter of the transistor Q1 to drop, which then turns on the encoder IC1. The enabled encoder IC1 produces the digital signal C that corresponds to the note of the specific key that is pressed on the electronic keyboard. The digital signal C is applied to the infrared transmitter IT1, where the digital signal modulates the output of the infrared diode to produce a modulated, digitally encoded IR signal that is radiated outward into space.

Infrared Receiving Circuit

The infrared receiving circuit 142 is comprised of an infrared receiver IR1, a decoder IC2 and a signaling device 38.

Figure 7B:
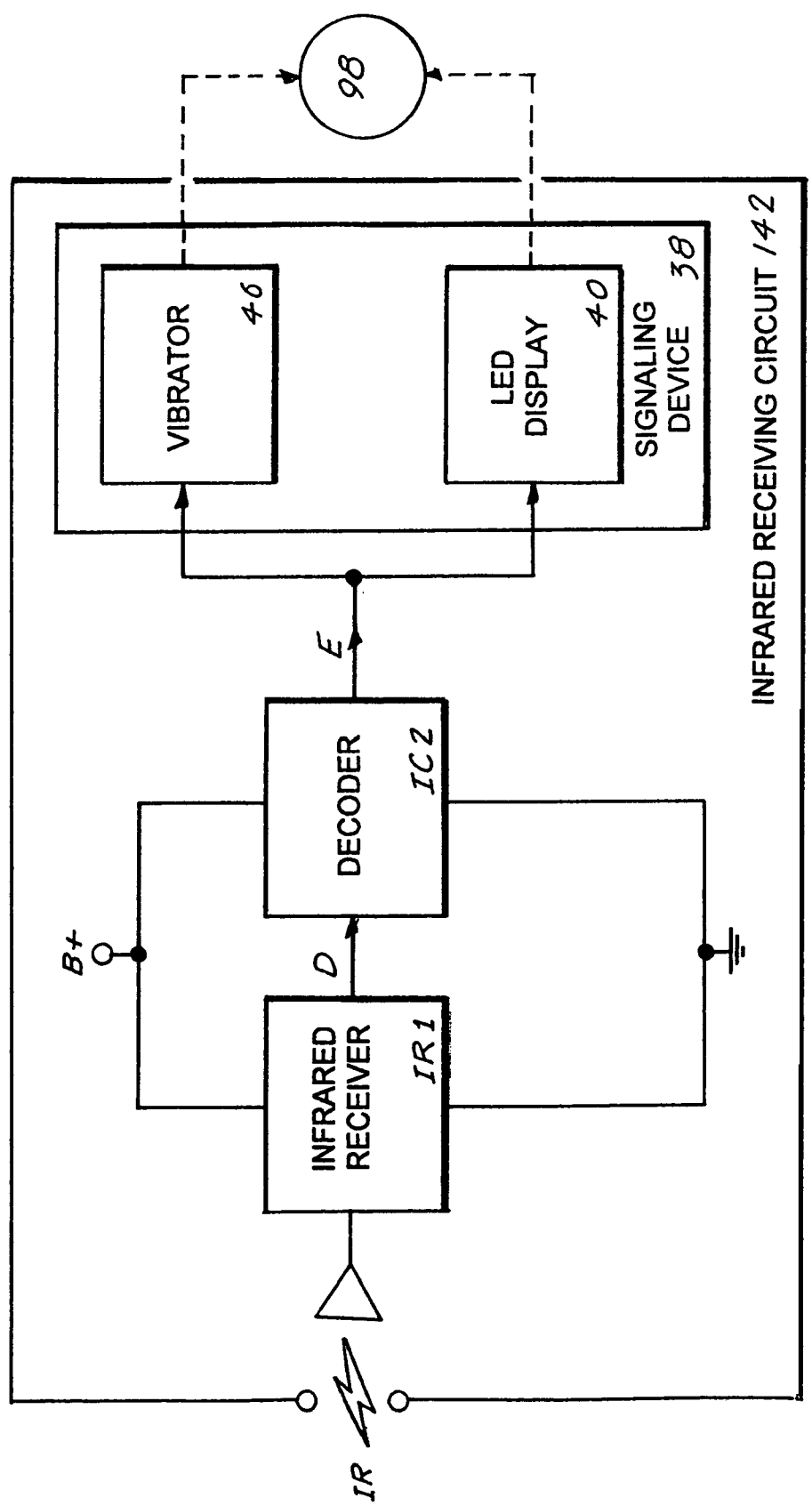
FIG. 7B is block diagram of the fifth embodiment showing an infrared receiving circuit.

The infrared receiver IR1, as shown in FIG. 7B, has a first input that receives within a line of sight, the encoded IR signal that is radiated form the infrared transmitter IT1, a second input that is connected to B+, a third input connected to circuit ground, and an output consisting of an amplified digital signal D. The decoder IC2 has a first input that is applied and decodes the digital output signal D from the infrared receiver IR1, a second input that is connected to B+, a third input connected to circuit ground, and an output consisting of a digital alert signal E or F.

The signaling device 38 when applied the alert signal E alerts a bell choir member to ring a particular handbell 98. As previously described, the signaling device 38 can consist of an LED display 40,42 that is attached directly to a handbell 98 by an attachment means 50, as shown in FIG. 8, an LED display 40,44 that is held by a hand that is not holding a hanbell 98, as shown in FIG. 9, or a vibrator 46 that is attached to a choir member's wrist, as shown in FIG. 10.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A musical instrument signaling system comprising:
    a) means for producing a set of musical notes,
    b) means for converting the set of musical notes into a corresponding set of electrical signals,
    c) means for passing the electrical signals to at least one remotely located musical instrument that is played by a person,
    d) means for receiving the electrical signals at the at least one remotely located musical instrument,
    e) at least one signaling device that is activated by a specific electrical signal, wherein when said at least one signaling device is activated, the person at the at least one remotely located musical instrument is alerted to commence playing the at least one remotely located musical instrument, and wherein when the specific electrical signal stops, said signaling device is deactivated, alerting the person to stop playing the at least one remotely located musical instrument,
    f) means for producing a set of musical notes, that is selected from the group consisting of an electrical keyboard, a piano, an organ, a xylophone and a pre-recorded device, and
    g) means for converting the set of musical notes into a corresponding set of electrical signals, comprising a first set of cables that pass the musical signals to a keyboard interface having means for processing and passing the electrical signals through a second set of cables to said at least one signaling device, wherein said first set of cables further comprise a set of series connected switches, wherein only those switches that correspond to a set of selected musical notes that will be used by the person playing the at least one musical instrument are closed.

2. The system as specified in claim 1 wherein said means for converting the set of musical notes from the electronic keyboard into a corresponding set of electrical signals comprises a first electronic circuit having means for converting the electrical signals and passing the converted signals to a set of R.F. transmitters that pass the electrical signals to a corresponding set of remotely located R.F. receivers that are located in a second electronics circuit having means for processing the electrical signals and applying the processed electrical signals to said at least one signaling device.

3. The system as specified in claim 2 wherein said first electronics circuit further comprises an electronic processor that is operated by a software program, wherein said software program is programmed to only allow the electrical signals corresponding to selected notes of a musical performance to be transmitted by said R.F. transmitter.

4. A musical instrument signaling system comprising:
a) means for producing a set of musical notes,
b) means for converting the set of musical notes into a corresponding set of electrical signals,
c) means for passing the electrical signals to at least one remotely located musical instrument that is played by a person,
d) means for receiving the electrical signals at the at least one remotely located musical instrument, and
e) at least one signaling device that is activated by a specific electrical signal, wherein when said at least one signaling device is activated, the person at the at least one remotely located musical instrument, which is selected from the group consisting of a handbell as used in bell choirs, Belleplate™, chimes and pipes, is alerted to commence playing the at least one remotely located musical instrument, and wherein when the specific electrical signal stops, said signaling device is deactivated, alerting the person to stop playing the at least one remotely located musical instrument.

5. A musical instrument signaling system comprising:
a) a transmitting circuit comprising:
 (1) at least one musical instrument that includes a MIDI processor having an output, wherein when an instrument note is activated said musical instrument produces a MIDI output signal containing coded digital data pertaining to the musical note selected, including a note ON and a note OFF,
 (2) a MIDI interface card that is applied the MIDI output signal and that produces a corresponding coded digital signal,
 (3) an electronic processor that is operated by a MIDI software program, wherein said electronic processor decodes the coded digital signal from the MIDI interface card and produces a set of three decoded serial digital signals consisting of a decoded note signal, a decoded note ON signal, and a decoded note OFF signal, wherein said software is programmed to only allow the notes applicable to a specific musical performance to be activated and transmitted,
 (4) an R.F. transmitter having means for receiving and modulating the three decoded digital signals applied from said electronic processor and producing a corresponding R.F. signal that is transmitted into space by a transmitting antenna,
b) a receiving circuit comprising:
 (1) a fixed-frequency R.F. receiver connected to a receiving antenna, said R.F. receiver having means for receiving the R.F. signal from said R.F. transmitter and producing a coded note signal that corresponds to the note being produced by said musical instrument,
 (2) a decoder that decodes the specific coded note signal from said R.F. receiver and produces a vibrator enabling signal and/or an LED enabling signal, and
 (3) a vibrator and/or an LED display that is activated respectively by the vibrator enabling signal, and the LED enabling signal, wherein when said vibrator and/or said at least one LED display are activated, a person playing the at least one remotely located musical instrument, which is selected from the group consisting of handbells, Belleplate™, chimes and pipes, is alerted to play the instrument.

6. The system as specified in claim 5 wherein said musical note producing instrument further comprises a means for producing a headphone enabling signal that allows a player of said electronic keyboard to hear what note is being played through a pair of headphones.

7. The system as specified in claim 5 wherein said electronic processor is selected from the group consisting of a microprocessor, a dedicated microcontroller, and a personal computer.

8. The system as specified in claim 5 wherein said receiving circuit is comprised of a plurality of hand-held units wherein each unit is tuned to receive a specific note.

9. A musical instrument signaling system comprising:
a) a transmitting circuit comprising:
 (1) an electronic keyboard having means for producing a keyboard output signal when a key is depressed wherein said means comprises, a variable resistor (R1) having a negative coefficient and that is dimensioned to be attached under each key of said electronic keyboard, and
 (2) a keyboard interface comprising:
  (a) a transistor (Q1) having an emitter, a base, and a collector, and
  (b) a resistor (R2) connected in series with resistor (R1) to form a voltage divider having a positive terminal (T1), a center tap terminal (T2), and a circuit ground terminal (T3), wherein terminal (T1) is connected to the emitter of transistor (Q1), terminal (T2) together with resistor (R1) is connected to the base of transistor (Q1), and grounded terminal (T3) and a lead from the collector of transistor (Q1) form an alert signal that is applied to said vibrator and/or said LED display,
 (3) a power supply that supplies power to said keyboard interface via a power cable, and
b) a receiving circuit comprising:
 (1) a vibrator that is powered by said power supply via said keyboard interface, wherein said vibrator is activated when an alert signal is applied from said keyboard interface, and/or
 (2) an LED display that is powered by said power supply via said keyboard interface, wherein said LED display is activated when an alert signal is applied from said keyboard interface, and wherein when said vibrator or said LED display are activated, they alert a person playing at least one remotely located musical instrument to play the at least one remotely located musical instrument.

10. The system as specified in claim 9 wherein said electronic keyboard further comprises a means for producing a headphone enabling signal that allows a player of said electronic keyboard to hear what note is being played through a pair of headphones.

11. A musical instrument signaling system comprising:
a) a transmitting circuit comprising:
 (1) an electronic keyboard having means for producing a keyboard output signal when a key is depressed,
 (2) a keyboard interface having means for receiving the keyboard output signal and producing a corresponding alert signal,
 (3) a power supply that supplies power to said keyboard interface via a power cable, and
b) a receiving circuit comprising:
 (1) a vibrator that is powered by said power supply via said keyboard interface, wherein said vibrator is activated when an alert signal is applied from said keyboard interface, and/or
 (2) an LED display that is powered by said power supply via said keyboard interface, wherein said LED display is activated when an alert signal is applied from said keyboard interface, and wherein when said vibrator or said LED display are activated, they alert a person playing at least one remotely located musical instrument to play the at least one remotely located musical instrument, which is selected from the group consisting of handbells, Belleplate™, chimes and pipes.

12. A musical instrument signaling system comprising:
   a) a transmitting circuit comprising:
      (1) an electronic keyboard having a set of keys, where to the upper or lower surface of each key is attached, by an attachment means, a pressure sensitive resistor that when depressed produces a keyboard output signal,
      (2) a set of R.F. transmitters corresponding to the set of keys on said electronic keyboard, wherein each said R.F. transmitter has a first input that is applied the keyboard output signal, a second input, and an output consisting of an R.F. signal that is transmitted into space through an R.F. transmitting antenna,
      (3) an electronic timer having means for producing a timing signal that is applied to the second input in each said R.F. transmitter,
   b) a receiving circuit comprising:
      (1) a fixed-frequency R.F. receiver connected to a receiving antenna, said R.F. receiver having means for receiving the transmitted R.F. signal from said R.F. transmitter and producing a transistor enabling signal,
      (2) a transistor having a base, an emitter and a collector, wherein the base is connected to the transistor enabling signal that is applied from said R.F. receiver, the collector is connected to circuit ground, and the emitter produces a vibrator enabling signal and/or an LED enabling signal, and
      (3) a vibrator that is activated by the vibrator enabling signal, and/or
      (4) at least one LED display that is activated by the LED enabling signal wherein when said vibrator and/or said LED display are activated, they alert a person playing at least one remotely located musical instrument to play the instrument.

13. The system as specified in claim 12 wherein said electronic timer is comprised of an NE555 integrated circuit.

14. The system as specified in claim 12 wherein the at least one remotely musical instrument is selected from the group consisting of handbells, Belleplate™, chimes and pipes.

15. The A musical instrument signaling system comprising:
   a) a first musical instrument that includes a MIDI processor having an output, wherein said MIDI processor is capable of being programmed to produce and send a multiplicity of MIDI commands,
   b) at least one other musical instrument which is selected from the group consisting of a set of handbells, Belleplate™, chimes and pipes, and that includes a MIDI processor having an input and a signaling means, wherein said MIDI processor is capable of receiving the MIDI commands produced by the first musical instrument and to utilize the MIDI commands to activate and deactivate the signaling means, and
   c) a MIDI cable for connecting the first musical instrument to the second musical instrument.

16. A musical instrument signaling system comprising:
   a) a first musical instrument that includes a MIDI processor having an output, wherein said MIDI processor is capable of producing and sending a multiplicity of MIDI commands,
   b) a MIDI router/splitter having a MIDI input and a plurality of MIDI outputs, wherein said MIDI router/splitter allows said multiplicity of MIDI commands that are received from the first musical instrument to each be selectively assigned to one of the MIDI outputs,
   c) at least one other musical instrument, wherein each musical instrument is selected from the group consisting of handbells, Belleplate™, chimes and pipes, and includes a MIDI processor having an input and signaling means, wherein each said MIDI processor is capable of receiving a MIDI ON or OFF command that is sent from the first musical instrument through the MIDI router/splitter and,
   (d) a set of MIDI cables, wherein a single MIDI cable is utilized to connect the first musical instrument's MIDI output to the MIDI router's/splitter's input, and a single MIDI cable is utilized to connect each of the MIDI router's/splitter's outputs to the MIDI input on one of the musical instruments in the set of second musical instruments.

17. A musical instrument signaling system that utilizes an infrared transmitting and receiving circuit that functions in combination with an electronic keyboard, a piano or an organ, each having a plurality of keys, and a person assigned to play a musical instrument, said infrared transmitting and receiving circuit comprising:
   a) said infrared transmitting circuit comprising:
      (1) a voltage divider consisting of a pressure sensitive resistor (R1) and a resistor (R2), wherein the pressure sensitive resistor (R1) is attached, by an attachment means, to a lower surface of each key, wherein the resistor (R1) and has a first end connected to a junction J1 and a second end connected to circuit ground, wherein said resistor (R2) has a first end connected to a positive voltage (B+) and a second end connected to the junction J1, from where a positive voltage A, as set by the voltage divider, is produced,
      (2) a transistor (Q1) having a base connected to the positive voltage A applied from the junction J1, that keeps transistor (Q1) initially turned off, an emitter connected to a junction J2 from where an ON-OFF digital signal B is produced, and a collector connected to circuit ground,
      (3) a current limiting resistor (R3) having a first end connected to B+ and a second end connected to the junction J2,
      (4) an encoder (IC1) having a first input that is applied the ON-OFF digital signal B, a second input connected to B+, a third input connected to circuit ground and an output consisting of a digital signal C,
      (5) an infrared transmitter (IT1) that comprises an internal driving transistor and an infrared diode, a first input that is applied the digital signal C, a second input connected to B+, a third input connected to circuit ground, and an output consisting of a digitally encoded infrared (IR) signal, wherein the initial voltage present at the junction J1 keeps said transistor (Q1) and said encoder (IC1) turned off, wherein when a key on the keyboard is pressed, the resistance of said pressure sensitive resistor (R1) drops, thereby causing the voltage at the junction J1 to also drop, which causes the transistor (Q1) to turn on which causes the voltage at the emitter of said transistor (Q1) to drop, which then turns on said encoder (IC1), wherein the enabled encoder (IC1) produces the digital signal C that corresponds to the specific key pressed, which is applied to the infrared transmitter (IT1), wherein the digital signal C modulates the output of the infrared diode to produce a modulated, digitally encoded IR signal that is radiated outward into space, b) said infrared receiving circuit comprising:
   (1) an infrared receiver having a first input that receives the encoded (IR) signal applied from said infrared transmitter, a second input connected to B+, a third input connected to circuit ground, and an output consisting of an amplified digital output signal D,
   (2) a decoder (IC2) having a first input that is applied and decodes the digital output signal D from said infrared receiver (IR1), a second input connected to B+, a third input connected to circuit ground, and an output consisting of a digital alert signal E, and
   (3) a signaling device that when applied the signal E from said decoder (IC2), the bell choir member is alerted to ring the particular handbell.

18. The system as specified in claim 17 wherein the musical instrument is selected from the group consisting of handbells, Belleplate™, chimes and pipes.

19. The system as specified in claim 18 wherein said pressure sensitive resistor (R1) has a peel and stick surface that comprises the means for attaching said resistor (R1) to the lower surface of each key.

20. The system as specified in claim 18 wherein the B+ voltage ranges between 5-volts d-c to 12-volts d-c, wherein a voltage of 9-volts d-c is preferred.

21. The system as specified in claim 20 wherein said transistor (Q1) is comprised of a PNP transistor.

22. The system as specified in claim 18 wherein the electronic keyboard, piano or organ further comprises a means for producing a headphone enabling signal that allows a player of the electronic keyboard, piano or organ to hear what note is being played through a pair of headphones.

* * * * *